US005645755A

United States Patent [19]
Wiesenfeld et al.

[11] Patent Number: 5,645,755
[45] Date of Patent: *Jul. 8, 1997

[54] ICE-MELTING COMPOSITION HAVING ANTI-CORROSION PROPERTIES

[75] Inventors: Arnold Wiesenfeld, Mahwah; James K. Barbour, Lincroft, both of N.J.

[73] Assignee: Castlebar Industries Corp., Red Bank, N.J.

[*] Notice: The term of this patent shall not extend beyond the expiration date of Pat. No. 5,366,650.

[21] Appl. No.: 504,515

[22] Filed: Jul. 20, 1995

[51] Int. Cl.$^6$ .................................................. C09K 3/18
[52] U.S. Cl. ........................................ 252/70; 106/13
[58] Field of Search ............................ 252/70; 106/13

[56] References Cited

U.S. PATENT DOCUMENTS

| | | | |
|---|---|---|---|
| 2,980,620 | 4/1961 | Hatch | 252/70 |
| 3,624,243 | 11/1971 | Scott, Jr. | 252/70 |
| 4,377,488 | 3/1983 | Gancy | 106/13 |
| 4,444,672 | 4/1984 | Gancy | 106/13 |
| 4,668,416 | 5/1987 | Neal | 106/13 |
| 4,728,393 | 3/1988 | Peel | 162/29 |
| 4,759,864 | 7/1988 | Van Neste et al. | 252/75 |
| 4,855,071 | 8/1989 | Todd, Jr. et al. | 252/70 |
| 4,986,925 | 1/1991 | Fiske | 252/70 |
| 4,990,278 | 2/1991 | Wyeth | 106/13 |
| 5,064,551 | 11/1991 | Smith | 252/70 |
| 5,211,868 | 5/1993 | Ireland et al. | 252/70 |
| 5,238,592 | 8/1993 | Stankowiak et al. | 252/70 |
| 5,366,650 | 11/1994 | Wiesenfeld et al. | 252/70 |

FOREIGN PATENT DOCUMENTS

| | | |
|---|---|---|
| 375214 | 6/1990 | European Pat. Off. . |
| 386886 | 9/1990 | European Pat. Off. . |
| 494506 | 7/1992 | European Pat. Off. . |
| 156918 | 9/1982 | Germany . |
| 60-195178 | 3/1984 | Japan . |

*Primary Examiner*—Anthony Green
*Attorney, Agent, or Firm*—Ezra Sutton

[57] ABSTRACT

An alkaline, non-phosphate, ice melter composition containing common deicers and anticorrosion chemicals (used to prevent base metal attack in acid pickling baths) and which is substantially less corrosive to steel than ordinary tap water. The composition will be environmentally safer and greatly reduce the corrosion of steel bridges, parking decks, railroad station platforms, guard rails on roads, other metal structures, and the like.

21 Claims, No Drawings

ICE-MELTING COMPOSITION HAVING ANTI-CORROSION PROPERTIES

FIELD OF THE INVENTION

The present invention relates to ice melters having a pH of greater than 7 to make them alkaline and having an anti-corrosion compound dispersed therein, such as 2 butyne-1,4 diol, so that the ice melter is environmentally safer than other typical deicers and greatly reduces the corrosion of steel bridges, parking decks, railroad station platforms, metal structures, guard rails on roads, and the like.

BACKGROUND OF THE INVENTION

Ice melters have been known and used for many years on roads, bridges, driveways, walkways, and the like. However, presently-used ice melters commonly cause corrosion damage to steel bridges, parking decks, railroad station platforms, guard rails on roads, metal structures, fences and gates, and the like. Although there have been attempts to reduce the corrosive effect of ice melters, they have not been sufficiently effective, and they are not always safe to the environment. For example, in U.S. Pat. No. 5,211,868, phosphates have been added to ice melters to reduce their corrosive effects, but phosphates have been barred by local ordinances in some areas because they are not environmentally safe. In U.S. Pat. No. 5,366,650, an anticorrosive compound such as 2-butyne-1,4-diol and an organic acid were well dispersed and incorporated with ice melters to produce a product which is about as corrosive as tap water. However, it has been found to be expensive.

Accordingly, it is an object of the present invention to provide an improved ice melter which has anti-corrosion properties, is environmentally safer, and is less expensive.

SUMMARY OF THE INVENTION

In the present invention, there is provided an ice-melting composition having anti-corrosion properties, which includes an ice-melting chemical selected from the group consisting of inorganic chloride salts, urea, ammonium sulfate, calcium magnesium acetate, and combinations thereof, with the ice-melting chemicals being at least 95% by weight of the ice-melting composition. The ice-melting chemicals have a pH value greater than 7 so as to be alkaline.

An anti-corrosion compound is mixed in the ice-melting composition in the range of trace amounts up to 5% by weight of the ice-melting composition, and in the preferred embodiment, the anti-corrosion compound is 2 butyne-1,4 diol and is 0.10% by weight of the ice-melting composition.

Although the amount of 2 butyne-1,4 diol is less than used in U.S. Pat. No. 5,366,650, it has been found to be more effective because the pH has been made alkaline instead of acidic.

Further objects, features, and advantages of the present invention will become apparent upon consideration of the detailed description of the presently-preferred embodiment.

DESCRIPTION OF PREFERRED EMBODIMENTS OF THE INVENTION

The present invention will work with most commonly-used ice melters or ice-melting chemicals, such as chloride salts, which include sodium chloride, potassium chloride, calcium chloride, and magnesium chloride. Examples of other ice-melting compounds include urea, ammonium sulfate, and calcium magnesium acetate.

In accordance with the present invention, any one of these ice melters, or any combination thereof, is combined with an anti-corrosion compound used to control base metal attack in acid pickling baths. The ice-melting composition of the present invention can be a physical mixture of the ice-melters and the anti-corrosion compound, or it can be a mixture of the crystallized solids obtained by evaporating a solution of the components. The anti-corrosion compound may be any of those used to protect base metals from attack in sulfuric acid or hydrochloric acid pickling baths. The preferred anti-corrosion compound is 2 butyne-1,4 diol.

In addition, other anti-corrosion compounds may be used, such as:

A. Thiourea and its derivatives. Examples of these compounds are:
  1. Diethyl thiourea
  2. Allyl thiourea
  3. 1-(3 amino-4-phenylazopyrazol-5-yl)-3-benzyl thiourea
  4. Quinoline
  5. Acriflavine B. Aromatic and alkyl amine and their derivatives. Examples of these compounds are:
  1. Alkyl aryl amines
  2. Alkynoxymethyl amines
  3. Oximines
  4. Nitriles
  5. Nitropyridine
  6. Lutidine
  7. Collidine
  8. Mono n-butyl amine
  9. Dibutyl amine
  10. Tributyl amine
  11. Phenylene diamine and derivatives (ortho, meta and para)
  12. Cyclo hexyl amine
  13. Diphenyl amine C. Quaternaries and their derivatives. Examples of these compounds are:
  1. 1,1'-alkylene bispyridinium compounds with quaternary substitution on the ring
  2. Hexamethylenetetramine hydro iodide D. Fatty acid ethoxylates and their derivatives. Examples of these compounds are:
  1. Tall oil fatty acid ethoxylates
  2. Soya bean fatty acid ethoxylates
  3. Cotton seed oil fatty acid ethoxylates
  4. Linseed oil fatty acid ethoxylates E. Sulfur-containing compounds. Examples of these compounds are:
  1. Sulfoxides
  2. Alkyl sulfides
  3. Dibutyl sulfide
  4. Thiosemicarbazide
  5. 1-phenyl thiosemicarbazide
  6. Metacaptans
  7. Thioethers
  8 Sulfonium
  9 Thiocyanates
  10. 2-Mercaptobenothiazole F. Acetylenic alcohol compounds. Examples of such compounds are:

2 Butyne-1,4 diol

2 Propyne-1-ol

G. Heteraromatic compounds. An example of such a compound is:

1. Benzotriazole

H. Miscellaneous compounds. Examples of these compounds are:

1. Formaldehyde
2. Furfuraldehyde
3. Biguanide
4. Guanylurea
5. Biuret
6. Coal tar extracts
7. para Toluene sulfonic acid
8. beta Naphthalene sulfonic acid
9. Katapins
10. Rodine (trade name) 204 [76162-22-8]
11. Chimec 315S [88385-18-6]
12. Tenzinat PA-221 [88403-32-1]
13. Rodine (trade name) 213

The anti-corrosion compound is mixed throughout the ice-melting crystals or chemicals, so they are released simultaneously with the dissolving of the ice-melting crystals. The anti-corrosion compound may range from trace amounts up to 5% by weight of the ice-melting composition of the present invention, but the preferred range is from trace amounts to 1% by weight, and the preferred embodiment is 0.10% by weight.

A trace amount of anti-corrosion compound is defined as 1 ppm to 50 ppm (0.0001% to 0.0050%), such that a minimal detectable amount of anti-corrosion compound can be analyzed by standard gas chromographic equipment used in a commercial lab testing facility.

The ice-melting chemicals normally used for melting ice, such as chloride salts, are typically basic and have a pH value above 7. Such ice-melting chemicals will perform as desired in accordance with the present invention, and it has been found that the ice-melting composition of the present invention should have a pH value greater than 7, so as to be slightly alkaline. Preferably, the pH value should be in the range of between 7.5 and 8.5. This can be accomplished by adding small amounts, as needed, by weight of a weak alkaline salt, such as sodium or potassium bicarbonate to the ice-melting composition, to adjust the pH value to the desired range. Alternatively, the ice-melting salts can have their pH value adjusted to greater than 7.

Laboratory tests have been conducted and support the results of the present invention. In laboratory tests, the corrosivity of various deicers were measured by an alternate immersion corrosion test involving the use of 2"×3" S.A.E. 1010 carbon steel panels which were degreased in hexane and dried after a methanol rinse. The steel panels had a ¼" diameter hole drilled in the center and near the top of the 2" side. The panels had numbers stamped in each of them. All panels were weighed to the nearest tenth of a milligram after drying. Three percent by dry weight basis of deicer solutions were prepared in all cases except for plain water. Four panels were suspended by a rod pushed through the ¼" holes and separated by segments of rubber tubing. Each assembly was suspended in the water or 3% deicer solutions such that the panels were immersed. During two 1 hour periods each work day the panels were suspended in air to achieve good contact with oxygen. The other 22 hours of each work day the panels were immersed. Over weekends, panels were immersed. At the end of each week, the old solution was removed and replaced with a new solution of the same type. At the end of one month the panels were removed and the solutions cleaned with 1820 g hot water, 180 g of concentrated hydrochloric acid and 2 g of Rodine 213. The panels were weighed and the mg of iron lost was reported.

A deicer base formula consisting of 18% magnesium chloride, 2% calcium chloride, 0.6% Urea, 0.05 to 0.7% anticorrosive package and the balance to 100% of sodium chloride was used for the evaluations.

TABLE 1

| Formula | Anticorrosion package | pH Value | mg Iron Lost |
|---|---|---|---|
| | Water (control) | 7.0 (neutral) | 42.6 |
| A | 2 Butyne-1,4-diol @ 0.19% | 8.0 | 8.3 |
| B | 2 Butyne-1,4-diol @ 0.05% | 8.0 | 19.7 |
| C | 2 Butyne-1,4-diol @ 0.5% Fumaric Acid @ 0.2% | 5.5 | 39.4 |

The above tests, in this example, indicate that when the ice melter is adjusted to be in the alkaline range, less of the anti-corrosion compound than used in U.S. Pat. No. 5,366,650 is necessary to provide corrosion levels that are a minor fraction of those of the water control. In contrast, in U.S. Patent 5,366,650, because the pH is adjusted to be acidic, 0.5% levels of the anti-corrosion compound are needed to have corrosion levels similar to that of the tap water control.

In a second study, using the same corrosion test, the concentration of the deicer compositions described above were varied from 5% to 20%, as shown in Table 2.

TABLE 2

| Formula of Anticorrosion Package | pH Value | mg Iron lost |
|---|---|---|
| Water (control) | 7.0 (neutral) | 38.1 |
| 5% solution of Formula A | 8.0 | 9.9 |
| 10% solution of Formula A | 8.0 | 13.1 |
| 20% solution of Formula A | 8.0 | 17.7 |
| 5% solution of Formula C | 5.5 | 37.8 |
| 10% solution of Formula C | 5.5 | 38.2 |
| 20% solution of Formula C | 5.5 | 34.5 |

The above tests of TABLE 2 show that at all levels of concentration including higher concentrations of ice melter, as would occur when they are used at progressively lower ambient temperatures, only very low levels of the anticorrosion chemical are needed when the formulation is alkaline to achieve far less corrosion than the tap water control. However, when the formulation is made acidic, higher levels of the anticorrosion compound are needed (i.e., 0.5%) just to equal the level of corrosion produced by the tap water control.

The present invention may be put into practice in ways other than the blended, ready-to-use, form previously described. A liquid concentrate may be employed, capable of being shipped distances, which contains one or more anticorrosion chemicals, ice melting chemicals (as needed) and pH adjusting chemicals (as needed) to insure that the final blended product has an alkaline pH. The liquid concentrate of the anti-corrosion chemicals and pH adjusting chemical (s) can be blended with water and sprayed at the local site onto solid ice-melting chemicals, such as rock salt or solar salt. The liquid concentrate of the anti-corrosion chemical and pH adjusting chemical(s) may also be added at the local site to a previously made liquid ice-melting chemical solution, such as calcium chloride (Ca Cl$_2$) or magnesium chloride (Mg Cl$_2$) and used to spray on roads, bridges and the like from a truck-spraying apparatus. Such a liquid concentrate that results in an ice-melter when blended containing up to 5% of the anti-corrosion chemicals covered by this patent are included in this invention.

The present invention may also be put into practice employing a solid dry concentrate capable of being shipped distances, containing one or more anti-corrosion chemicals, ice melting chemicals (as needed) and pH adjusting chemicals (as needed) to insure that the final dry blended product has an alkaline pH. The solid dry concentrate of the anti-corrosion chemicals and pH adjusting chemical(s) ie, sodium bicarbonate, as needed, can be blended in a premix concentrate of magnesium chloride hexahydrate, calcium chloride dihydrate, and urea.

Table 3 shows an example of the concentrations of the pre-mixed chemicals, along with the anticorrosion chemical of 2 butyne-1,4-diol. The premix concentrate is 21.1% of the final product, and the remaining balance is sodium chloride. This dry solid concentrate can be shipped to the local site and blended with other solid ice-melting chemicals, such as rock salt or solar salt. Alternatively, the dry solid concentrate of the anti-corrosion chemical(s) and pH adjusting chemical (s) can be added at the local site to a previously-made liquid ice-melting chemical solution, such as calcium chloride (Ca Cl$_2$) or magnesium chloride (Mg Cl$_2$), and used to spray on roads, bridges and the like from a truck-spraying apparatus. Such a dry solid concentrate that results in an ice-melter when blended containing up to 5% of the anti-corrosion chemicals covered by this patent are included in this invention.

TABLE 3

| An Illustrative Formula For a Premixed Concentrate | |
|---|---|
| Magnesium Hexahydrate | 84.5% |
| Calcium Chloride Tetrahydrate | 9.5% |
| Urea | 2.8% |
| 2 Butyne-1,4-diol | 2.2% |
| Sodium Bicarbonate, up to (as needed for alkalinity control) | 1.0% |

The procedure for making the dry solid concentrate is accomplished by adding the 2 butyne-1,4-diol to the magnesium chloride and mixing these chemicals completely until the 2 butyne-1,4-diol has coated the magnesium chloride. This mixture is then added to the calcium chloride and further blended until the pre-mix is dry. Then the urea compound is blended into the mixture to produce a dry, dispersed composition which then can be bagged and shipped to appropriate locations.

In the present invention, part of the ice-melting components may be replaced with other ingredients so as to impart special properties to the final mix. Examples are substituting sand or grit for traction, or a dye for appearance, or a dye to make it obvious where the ice-melter has been spread.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An ice-melting composition having anti-corrosion properties, comprising:
   a) an ice-melting chemical selected from the group consisting of a chloride salt, urea, ammonium sulfate, calcium magnesium acetate, and combinations thereof, said ice-melting chemicals being at least 95% by weight of said ice-melting composition;
   b) said ice-melting chemicals having a pH value of greater than 7 so as to be alkaline; and
   c) an anti-corrosion compound being 2 butyne-1,4 diol in said ice-melting composition in the range of trace amounts up to 5% by weight of said ice-melting composition.

2. An ice-melting composition in accordance with claim 1, wherein said chloride salt is sodium chloride, potassium chloride, calcium chloride, or magnesium chloride.

3. An ice-melting composition in accordance with claim 1, wherein said ice-melting chemicals have a pH in the range of between 7.5 and 8.5.

4. An ice-melting composition in accordance with claim 1, wherein said 2 butyne-1,4 diol is dispersed in said ice-melting composition in the range of 1 ppm up to 1% by weight.

5. An ice-melting composition in accordance with claim 1, wherein said 2 butyne-1,4 diol is dispersed in said ice-melting composition in the amount of 0.10% by weight.

6. An ice-melting composition having anti-corrosion properties, comprising:
   a) an ice-melting chemical selected from the group consisting of a chloride salt, urea, ammonium sulfate, calcium magnesium acetate, and combinations thereof, said ice-melting chemicals being at least 95% by weight of said ice-melting composition;
   b) said ice-melting chemicals having a pH value of greater than 7 so as to be alkaline; and
   c) an anti-corrosion compound dispersed in said ice-melting composition in the range of trace amounts up to 5% by weight of said ice-melting composition selected from the group consisting of an acelylenic alcohol derivative, alkyl amine, oximine, aryl amine, a thiourea derivative, and an alkyl amine derivative.

7. An ice-melting composition in accordance with claim 6, wherein said chloride salt is sodium chloride, potassium chloride, calcium chloride, or magnesium chloride.

8. An ice-melting composition in accordance with claim 6, wherein said ice-melting chemicals have a pH in the range of between 7.5 and 8.5.

9. An ice-melting composition in accordance with claim 6, wherein said acelylenic alcohol derivative is dispersed in said ice-melting composition in the range of 1 ppm up to 1% by weight.

10. An ice-melting composition in accordance with claim 6, wherein said acelylenic alcohol derivative is dispersed in said ice-melting composition in the amount of 0.10% by weight.

11. An ice-melting composition in accordance with claim 6, wherein said alkyl amine is dispersed in said ice-melting composition in the range of 1 ppm up to 1% by weight.

12. An ice-melting composition in accordance with claim 6, wherein said alkyl amine is dispersed in said ice-melting composition in the amount of 0.10% by weight.

13. An ice-melting composition in accordance with claim 6, wherein said oximine is dispersed in said ice-melting composition in the range of 1 ppm up to 1% by weight.

14. An ice-melting composition in accordance with claim 6, wherein said oximine is dispersed in said ice-melting composition in the amount of 0.10% by weight.

15. An ice-melting composition in accordance with claim 6, wherein said aryl amine is dispersed in said ice-melting composition in the range of 1 ppm up to 1% by weight.

16. An ice-melting composition in accordance with claim 6, wherein said aryl amine is dispersed in said ice-melting composition in the amount of 0.10% by weight.

17. An ice-melting composition in accordance with claim 6, wherein said thiourea derivative is dispersed in said ice-melting composition in the range of 1 ppm up to 1% by weight.

18. An ice-melting composition in accordance with claim 6, wherein said thiourea derivative is dispersed in said ice-melting composition in the amount of 0.10% by weight.

19. An ice-melting composition in accordance with claim 6 wherein said anti-corrosion compound is in the form of a liquid concentrate that can be dispersed onto said ice-melting chemicals.

20. An ice-melting composition in accordance with claim 6 wherein said anti-corrosion compound is in the form of a dry solid concentrate that is blended with said ice-melting chemicals.

21. An ice-melting composition in accordance with claim 20 wherein said ice-melting chemical is in a liquid form and wherein said dry solid concentrate is dispersed and blended with said ice-melting chemical in a liquid form.

* * * * *